United States Patent
Winter et al.

(10) Patent No.: US 8,844,708 B2
(45) Date of Patent: Sep. 30, 2014

(54) DEVICE AND METHOD FOR THE TRANSFER OF CONTAINER FITTINGS

(71) Applicant: Krones AG, Neutraubling (DE)

(72) Inventors: Horst Winter, Neutraubling (DE); Heinz Humele, Thalmassing (DE); Volker Kronseder, Neutraubling (DE); Hartmut Davidson, Zeitlarn (DE); Josef Scheck, Mangolding (DE)

(73) Assignee: Krones AG, Neutraubling (DE)

( * ) Notice: Subject to any disclaimer, the term of this patent is extended or adjusted under 35 U.S.C. 154(b) by 0 days.

(21) Appl. No.: 13/691,116

(22) Filed: Nov. 30, 2012

(65) Prior Publication Data
US 2013/0168206 A1    Jul. 4, 2013

(30) Foreign Application Priority Data

Dec. 30, 2011 (EP) .................................... 11196201

(51) Int. Cl.
| | |
|---|---|
| *B65G 47/84* | (2006.01) |
| *B65G 29/00* | (2006.01) |
| *B65C 9/16* | (2006.01) |
| *B65C 9/40* | (2006.01) |
| *B65G 47/86* | (2006.01) |

(52) U.S. Cl.
CPC .............. *B65G 29/00* (2013.01); *B65G 47/847* (2013.01); *B65C 9/16* (2013.01); *B65C 9/40* (2013.01)
USPC ..................................... 198/470.1; 198/478.1

(58) Field of Classification Search
USPC .......................................... 198/470.1, 478.1
See application file for complete search history.

(56) References Cited

U.S. PATENT DOCUMENTS

| | | | | |
|---|---|---|---|---|
| 4,120,492 A | * | 10/1978 | Cerny ........................... | 271/277 |
| 4,132,403 A | * | 1/1979 | Weisbach et al. ............. | 271/277 |
| 5,787,598 A | | 8/1998 | Tillis, Sr. et al. | |
| 6,112,880 A | * | 9/2000 | Flix ............................ | 198/419.2 |
| 8,322,514 B2 | * | 12/2012 | Bonnain et al. ............... | 198/430 |
| 2011/0036684 A1 | * | 2/2011 | Bonnain ..................... | 198/418.7 |

FOREIGN PATENT DOCUMENTS

| | | |
|---|---|---|
| DE | 1486142 A1 | 4/1969 |
| DE | 2544277 A1 | 4/1977 |
| DE | 19851631 A1 | 5/2000 |
| DE | 19845964 A1 | 6/2000 |
| EP | 1939096 A1 | 7/2008 |

OTHER PUBLICATIONS

European search report for EP 11196201.5 dated Jun. 20, 2012.

* cited by examiner

*Primary Examiner* — William R Harp
(74) *Attorney, Agent, or Firm* — Marshall, Gerstein & Borun LLP

(57) ABSTRACT

A device for transferring fittings having at least two gripper units offset in the circumferential direction around a transfer axis of a transfer station. Each gripper unit can be activated in a clocked manner, whereby each gripper unit takes over from a feeder, via a movement around the transfer axis generated by an electric servomotor, at least one container fitting individually from a moving take-over position of a feeder and transfers it through the transfer station to a moving hand-over position offset in the circumferential direction of the transfer station. The gripper units are arranged such that they move around the transfer axis relative to one another. The transfer station includes the electric servomotors as drive motors of the gripper units for generating within one full revolution of each gripper unit individually periodically non-uniform movements of the gripper units in the circumferential direction.

30 Claims, 4 Drawing Sheets

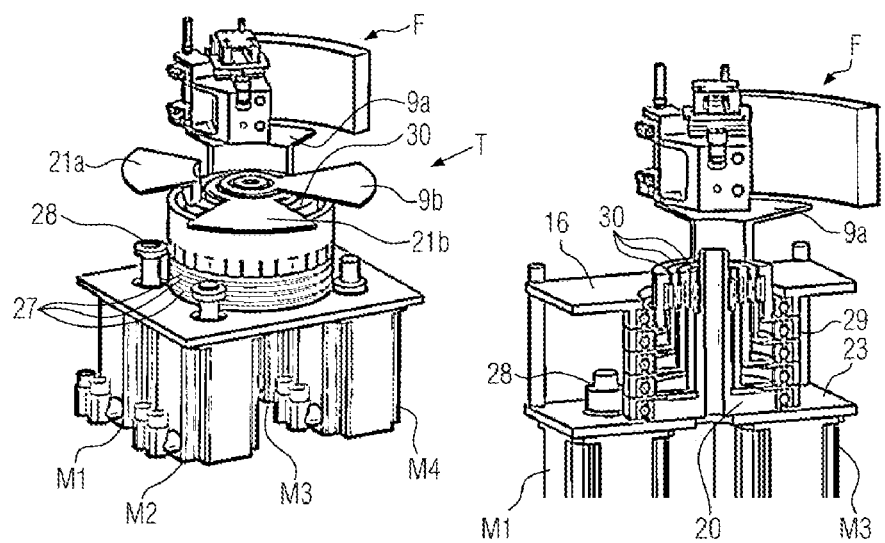
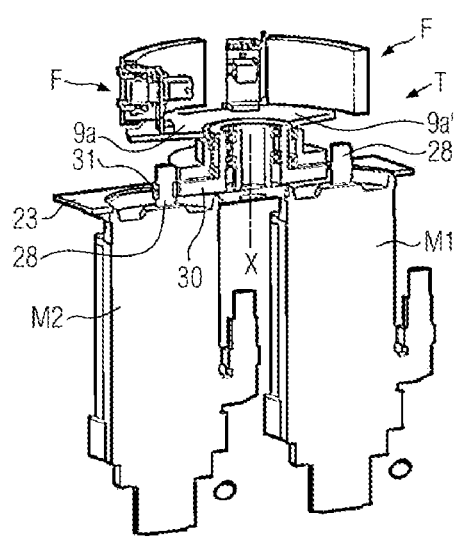
FIG. 10

DEVICE AND METHOD FOR THE TRANSFER OF CONTAINER FITTINGS

CROSS-REFERENCE TO RELATED APPLICATIONS

The present application claims the benefit of priority of European Application No. 11 196 201.5, filed Dec. 30, 2011. The entire text of the priority application is incorporated herein by reference in its entirety.

FIELD OF DISCLOSURE

The disclosure relates to a device and to a method for the transfer of container fittings, such as labels for bottles during beverage bottling operations.

Known from U.S. Pat. No. 5,787,598, FIG. 2, is a gripper cylinder of a transfer system of a labeling device, whereby the gripper cylinder is equipped with six gripper units, each having two gripper fingers, and can be rotated with a central shaft around the transfer axis. The continuous driving movement of the gripper cylinder is synchronized synchronized with that of glue pallets of a feeder (toothed gears). Because the gripper units are mounted on the gripper cylinder at regular intervals and with fixed relative geometric arrangements, the gripper cylinder must be exchanged in the event that there is a change in the fitting, here a type of label, and/or in the event of a division change in the containers that are to be labeled. This is time-consuming and arduous, and necessitates the provision of many different exchange parts in appropriately large-dimensioned magazine areas, which is expensive. Each exchange furthermore necessitates an inexpediently long downtime.

Known from EP 1 939 096 A is a transfer station of a labeling device having a gripper cylinder with, for example, ten gripper units mounted at constant distances around the circumference. The gripper cylinder is driven synchronously with a feeder's glue pallets that provide labels, and also synchronously with a carousel for the containers that are to be labeled, whereby the division between the gripper units is suitable for dividing both the glue pallets and the containers. In the event that there is a change in the division, for example, between the containers that are to be labeled, it is necessary to replace the gripper cylinder with a different one. The transfer station, however, is formed and equipped in such a manner that it can be adapted, without an exchange, to a new label format when the device is at a standstill because the gripper units on the gripper cylinder can be adjusted optionally by motor on the same gripper cylinder in different cooperation positions with the glue pallets and the containers. In the event of such an adjustment, the gripper unit is brought into a new cooperation position via an adjustment drive that is integrated into the gripper cylinder such that it is parallel and/or radial to the transfer axis of the gripper cylinder before the operation can be continued.

Known as a transfer station of a labeling device from DE 14 86 142 A is a continuously driven gripper cylinder that simultaneously transfers labels for the body and for the neck of bottles in different levels. At least the pressure elements of the gripper units for the neck labels are movable relative to the gripper cylinder in the rotational path direction against a spring force, so that in the event of contact with the bottle there comes about a temporary acceleration of the pressure element due to a frictional connection, in order that the neck label, which is applied to a reference diameter that is larger than that of the body label, can be applied gently and precisely on to the bottleneck. A change in the label type or a different division between the bottles to be labelled necessitates an exchange of the gripper cylinder, which is driven synchronously by and with the feeder that is equipped with the glue pallets.

DE 25 44 277 A deals with a gripper cylinder that is formed as a transfer station for the simultaneous transfer of body and neck labels for bottles, whereby the levels lying one above the other of the gripper cylinder are driven synchronously with the feeder which has the glue pallet, and whereby in this gripper cylinder the gripper units are mounted, each in a specified relative position, whereby these relative positions are suited to the division of the glue pallets and also to the division of the bottles that are to be labeled. The gripper units for the neck labels are, however, movable radially to the transfer axis by means of crank arms anchored in the gripper cylinder, whereby the crank arms lie, with jockey rollers, against stationary control cams. Furthermore, each gripper unit of a neck label is rigidly connected to a further crank, which, with a jockey roller, lies against a further stationary control cam, in order to cause the gripper unit additionally also to deviate around a pivot bearing on the first crank arm. These additional relative movements of the gripper units of the neck labels are utilized in order to make it possible also to apply the neck labels precisely when the body and neck labels are applied simultaneously. For a different bottle type or a different division between the bottles that are to be labeled and, where applicable, also in the event that there is a change in the type of label, the gripper cylinder, which is driven continuously via the feeder, is completely replaced with one that then is suitable.

From the geometric relationship with regard to the gripper units in the gripper cylinder of these known transfer stations, the geometric relationship being specified as far as possible, there results the necessity of a gripper cylinder exchange as soon as the delivery conditions and/or delivery divisions and/or container sizes are to be changed.

SUMMARY OF THE DISCLOSURE

One aspect of the disclosure is a device and a method of the type mentioned at the beginning with which the complexity of known devices for the same purpose can be reduced drastically, which can be used universally on different fitting application machines, and which can be used, without an exchange of the transfer station, for different fitting measurements, container dimensions, container divisions and system outputs and, at least as far as possible, without manual interventions.

In terms of the device, the transfer station is no longer formed as a geometrically rigid rotational cylinder, but is instead replaced with a highly flexible transfer system in which at least one gripper unit can be driven individually with a selectable speed profile in the direction of rotation, that, on the one hand, is synchronous exactly with that of the feeder and, on the other hand, is synchronous with that of the delivery position, while in movement areas lying in between it is possible to slow the gripper unit down or speed it up, which makes it possible during the processing to handle different circumferential dimensions of the fittings, as well as to cope with different container diameters and containers or container-conveying divisions easily with a single transfer station and without exchanging it. Because the drive motors are arranged in the transfer station, they can be controlled easily by means of a program, without manual intervention being necessary, and above all without forcing an exchange when the previously mentioned working parameters have to be changed.

In terms of the method, the possibility of driving the gripper units around the transfer axis at periodically non-uniform speeds within one full rotation allows, via the activation of the drive motors, an easy adaptation to changing working parameters, such as to the fitting measurement at least in the circumferential direction, to the container diameter, to the bottle table division and to the system output, as well as, where applicable, to the feeder division and feeder speed, without having to exchange equipment parts. The method can be adapted conveniently at any time to different working parameters with a type of the transfer station and its drive concept and it allows, even during operation, a readjustment at any time because a fixed allocation among the gripping units in the circumferential direction is eliminated and these are moved with individual control, instead of commonly by a shared drive.

Each full rotation of a gripping unit is expediently divided into a plurality of successive drive motor control areas of each drive motor, namely into a take-over sector that is synchronized to the rotational path movement of the feeder take-over position, into a subsequent first control sector with acceleration or delay individually coordinated to at least the second division between the delivery positions and/or to the dimension of the fittings in the circumferential direction and/or to the diameter or shape of the container, into a subsequent delivery sector synchronized with a rotational path movement or passing-by movement of the hand-over position, and a concluding, second control sector that is individually coordinated at least to the division between the take-over positions and/or to the dimension of the fitting in the circumferential direction and/or to the container dimension and having acceleration or delay of the gripper unit.

In the case of an expedient embodiment, two or more than two gripper units of the transfer station are provided, and a separate drive motor, preferably an electric drive motor, for each gripper unit is accommodated in the transfer station.

In the case of an alternative embodiment, two or more than two gripper units, preferably an even number, are provided in the transfer station, and a shared drive motor is provided for at least every two of the gripper units, preferably successive gripper units in the circumferential direction. At least two gripper units that share a common drive motor represent a considerable reduction in the constructional effort in the transfer station. In the case of at least four gripper units in the transfer station, two always move synchronously and differently in the circumferential direction relative to the others, whereby within each full rotation, however, only one gripper unit of the two coupled ones fulfils a take-over or delivery or hand-over function that can be controlled or regulated precisely via the drive motor, while the respective other of the two gripper units then carries out only a simple transfer function, whereas then the two are released from a take-over or delivery function as soon as an individual acceleration or delay is to be controlled.

In the case of an expedient embodiment, each drive motor is an electric servomotor and either is formed as a direct drive or is connected to the at least one gripper unit via a gearbox.

In the case of another expedient embodiment, the respective drive motor in the transfer station is an electric torque motor with a stationary coil-part-containing stator and a ring armature that bears magnets and is coupled to the at least one gripper unit, whereby the plurality of torque motors are stacked one above the other and/or nested one inside the other coaxially to the transfer axis.

Regardless of the type of the drive motor, each gripper unit that is connected to a drive motor is or gripper units that are connected to a shared drive motor are supported in a manner that allows rotation directly around the transfer axis, which saves constructed space and results in a constructional simplification, preferably in a central multiple hollow shaft-bearing area and/or at least one large-diameter outer bearing area.

Each gripper unit or at least the pair of gripper units is expediently arranged on a lever arm that bridges a predetermined radial distance to the transfer axis and that is arranged on a shaft, preferably a hollow shaft, that is coaxial with the transfer axis. In the interior of each inner-most hollow shaft or of a stationary pivot bearing hollow shaft, power or signal transmission lines, for example, to the gripper units, can be installed, for example, for the activation of the gripper units and/or additionally in order to adjust these at least roughly radially to the transfer axis.

If electric servomotors are used as drive motors, each of these can be arranged offset laterally to the transfer axis in a stationary manner and connected to the lever arms or gripper units via gearbox connections.

In an expedient embodiment, each gripper unit comprises an anvil strip, at least a pressure pad, as an assembly and, along the anvil strip, at least one gripper finger that is switched between gripping and release positions relative to the anvil strip in the event of the activation of the gripper unit, expediently with a drive integrated into the gripper unit.

In the case of another embodiment, each gripper unit can comprise, lying one above the other in the direction of the transfer axis, at least two assemblies for simultaneous transfer of different fittings, for example, for simultaneous transfer and application of body and neck labels or the like.

In order to make it possible to eliminate complex control cams, each gripper unit can comprise additionally a separate activation motor for activating the gripper fingers to grip or release a container fitting, preferably an electric servomotor, an activation magnet, a piezo drive or a pneumatic cylinder, that preferably is arranged directly or indirectly on the lever arm bearing the gripper unit. The signal/energy transmission needed for activating the activation motors can take place without wires.

In order to allow an even better adjustment to working parameters that are to be changed, each gripper unit can have, for example, on the lever arm, an additional degree of mobility, preferably in the direction roughly radial or linear to the transfer axis, and a lever arm drive motor, preferably an electric or pneumatic linear motor, for the adjustment of the gripper unit relative to the lever arm in the direction of the additional degree of mobility. In this way, it is also possible to vary individually the reference diameter of the rotational path of each gripper unit within a full rotation.

In the case of a constructionally simple embodiment, the lever arm that connects the at least two gripper units of the total of more than two gripper units in the transfer station to the shared drive motor is formed as a bell-crank lever arm that bears a gripper unit on each of the two arm ends facing outwards away from the transfer axis and that is supported in a rotational manner on the transfer axis in the area of the angle bend and coupled to the drive motor.

It can be advantageous thereby if the bell-crank lever arm is angled at roughly 90°. This is particularly expedient in the case of a transfer station with four gripper units. The angular range can be selected differently in the case of a higher number of gripper units.

In order to avoid collisions when the gripper units revolve at different movement speeds, it can be expedient if the lever arms are arranged in the transfer station at different levels in the direction of the transfer axis, at least in interior sub-areas.

In order to be able to guarantee clean and low-vibration running, it can furthermore be expedient if an imbalance compensation mass is provided for each gripper unit or for a plurality of gripper units arranged on a lever arm, for example, lying opposite the same.

Particularly expediently, the transfer station is formed so as to be modifiable modularly by means of the addition or removal of at least one gripper unit, preferably plus its drive motor, or by means of coupling it to or decoupling it from the permanently installed drive motor. In this way, even in the event that there are serious changes in the working parameters, no exchange of the entire transfer station is required, and instead it is possible only to remove or add set parts that are optionally of the same kind as the gripper units.

The drive motors are expediently connected to an electronic controller that, preferably, can be programmed for adjustment of the transfer station at least to different dimensions of the fittings in the circumferential direction and/or to different first and/or second divisions and/or to different container diameters or shapes, and/or that holds available corresponding programs that can be selected without manual manipulations in the transfer station.

In the case of an expedient execution of the method, each gripper unit is, in a take-over sector of a full rotation of its rotational path aligned to a moving take-over position, driven to alignment with the first division in the feeder and synchronously with the take-over position, in a subsequent first control sector, accelerated or delayed in individual coordination at least with the second division between the delivery or hand-over position and/or with the dimension of the fitting in the circumferential direction and/or with the container diameter, in a subsequent delivery sector, driven, in alignment to the second division between the container and synchronously with the movement of the delivery or handover position or rotational speed of the container surface, and, in a concluding second control sector, again accelerated or delayed for further individual coordination to the first division and/or to the speed of the take-over position and/or to the dimension of the fitting in the circumferential direction. Due to this sub-division into the sectors that is taken into consideration during the control of the drive motors, not only is each gripper unit driven correctly to its take-over or delivery or hand-over situation station, each is also driven independently of every other gripper unit, and the preparatory adjustment of the movement speed of the gripper unit for the coming delivery or take-over function is in turn independent of every other gripper unit in the control areas. If at least two of a total of at least four gripper units are permanently coupled, the sequence of the method can nevertheless be regulated just as sensitively because the respective second gripper unit of the permanently coupled pair then exercises only a simple transfer function without cooperation with any other assemblies outside of the transfer station when the other of the permanently coupled gripper units is just fulfilling a take-over function or delivery or hand-over function, and the individual accelerations and delays for a gripper unit are regulated at that time during the control sectors at which neither of the two coupled gripper units has a take-over or delivery function.

BRIEF DESCRIPTION OF THE DRAWINGS

Embodiments of the subject matter of the disclosure are explained using the drawings. Shown are.

DETAILED DESCRIPTION

The transfer stations T shown in FIGS. 1 to 10 are used for the take-over, transfer and delivery or hand-over of fittings, particularly for container labeling, preferably bottle labeling, whereby the fittings can be labels, tin foil cuttings, flat or relief-like applications or logos and the like. The transfer stations T are explained in the following in conjunction with a cold glue labeling device for bottles made of glass or plastic, although the same principle can also be applied to hot glue or vacuum techniques or the like and also to other kinds of containers. The invention is furthermore explained on the basis of a transfer station in which the fittings are applied in only one plane and onto the containers, although different fittings for different container areas could also be processed in the transfer station in planes or levels that lie one above the other (indicated schematically in FIG. 4). The respective transfer station T replaces the gripper cylinder normally used for the transfer of fittings in such machines, and it can be adapted universally to different feeder systems and/or container transport systems and combined modularly with these, and it can be modified modularly without an exchange of the transfer station T.

Figure 1:
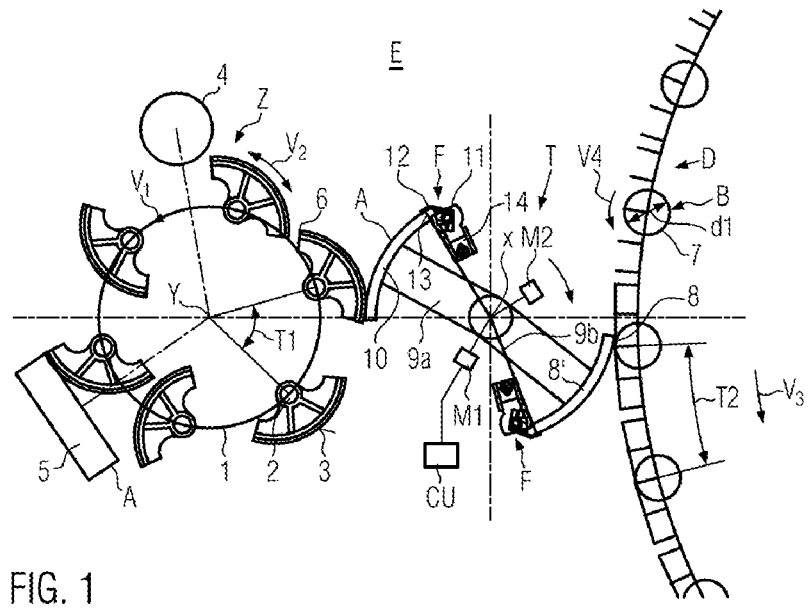
FIG. 1 a schematic top view of a device for the transfer and application of fittings within a sequence of the method while labeling containers and with a transfer station that has two gripper units, FIG. 2 a schematic top view onto another embodiment, within the sequence of the method, with a transfer station that has four gripper units, FIG. 3 a further schematized top view for clarification of the sequence of the method, FIG. 4 a perspective half-section depiction of a concrete embodiment of a transfer station, whereby parts have been left out for the sake of clarity, FIG. 5 a perspective view of core assemblies of a further embodiment of the transfer station, FIG. 6 a schematized axial section of the embodiment from FIG. 5 in a detailed variant, FIG. 7 a further schematized axial section of the embodiment of FIG. 5 as a further detailed variant, FIG. 8 a perspective view of a further embodiment of a transfer station, FIG. 9 an axial section of the embodiment of FIG. 8 and FIG. 10 an axial section of a further detailed variant, similar to the transfer station shown in a schematized manner in FIG. 2.

In a top view, FIG. 1 illustrates primary assemblies of a labeling machine E for the continuous labeling of containers B, for example, plastic or glass bottles, with fittings A formed as prefabricated and fitted labels. A feeder Z for the separated fittings A has a rotor 1 that is driven rotationally around an axis Y, whereby on this rotor 1 glue pallets 3 are arranged on pivot shafts 2 such that they can pivot, are located at equal radial distances from the axis Y and have a periodic first division T1, whereby these pivot shafts 2 are driven by a lantern wheel (not shown) both in a rotational path movement at a speed V1 and also in a back and forth pivoting movement at a speed V2. At least one glue roller 4 is allocated to the glue pallets 3, whereby the curved surface of each glue pallet 3 is coated with, for example, cold glue on this glue roller 4, before being moved past a fittings magazine 5 from which each glue pallet 3 (if pivoted into a pick-up position, and not, as optionally possible, held passively) takes up a fitting A which it delivers to the transfer station T. The respective glue pallet 3 thereby defines a take-over position 6 that moves at a specific speed that results from the speeds V1 and V2.

On a stationary base frame (not shown in FIG. 1), the transfer station T has first and second drive motors M1 and M2 and defines a transfer axis X that runs parallel to the axis Y, whereby two gripper units F are driven individually around this transfer axis X, in a manner that allows free rotational movement, by the drive motors M1, M2 in the embodiment shown in FIG. 1. The drive motors M1, M2 are expediently electric motors, either servomotors or torque motors, that are connected in terms of control and regulation to a central controller CU. The controller CU is preferably an electronic and programmable controller or a controller that holds programs. Each gripper unit F is mounted on a lever arm 9a, 9b that extends outwards roughly radially from the transfer axis X and that is supported centrally in a manner that allows pivoting by a bearing area indicated by a full circle. In the shown embodiment, each gripper unit F comprises at least one elastic pressure pad 10 with, where applicable, a molded surface, an anvil strip 13 oriented approximately parallel to the transfer axis X and at least one gripper finger 12 arranged along the anvil strip 13, whereby this at least one gripper finger 12 can be adjusted in a clocked manner relative to the anvil strip 13 between gripping and release positions (in FIG. 1, gripping position at the top and release position at the bottom) and around a pivot axis 11 by an activation drive 14, in order to grip a fitting A and take it over from the feeder Z, transfer the gripped fitting A to the container B and apply the same to the container B and release it.

The upper gripper unit F in FIG. 1 has first been positioned by its drive motor M1 by a clockwise rotational path movement that is synchronized with the surface of a glue pallet 3 such that the gripper finger 12 has grabbed an end of the fitting A at the take-over position 6 and during the further movement has drawn it off of the glue pallet 3 and laid it onto the pressure pad 10, as is indicated in FIG. 1 at the top. In the meantime, or before or after this, the second gripper unit F has already handed over to a container B a fitting A, which was previously taken over in the same way at the take-over position 6, at a hand-over position 8 that moves at a speed V3 of, here, a rotary table D, whereby the hand-over position 8' that is correlated to the hand-over position 8 was roughly in the middle of the pressure pad 10 seen in its circumferential direction. Although the applied fitting A is shown still extended in FIG. 1, it is wrapped around the container B by the rotational movement (speed V4), supported by application devices that are not shown. During the delivery, the gripper unit F (the lower one in FIG. 1) moves around the transfer axis X in a manner that is exactly synchronous with the speed of the drive motor M2, said speed resulting from superimposing the speeds V3 and V4. During the hand-over, the gripper finger 12 was activated into the release position, so that the fitting A was taken along due to the glue application by the container B and has left the pressure pad 10. The gripper in question is then moved back to the feeder Z by the drive motor M1, M2.

The containers B are positioned individually on rotary tables 7 of the rotary table D and are driven by the rotary tables 7 at the circumferential speed V4. Between the successive containers B there lies a second periodic division T2, whereby the containers B have the same diameter d1. Between the take-over (in FIG. 1 at the top, right before the conclusion) and the delivery or hand-over of one fitting A at a time (in FIG. 1 at the bottom, just completed), during which time the respective gripper unit F was driven clockwise synchronously with the take-over position 6 or synchronously with the hand-over position 8, there lie two additional control sectors within a full rotation, in which the gripper devices F execute a simple transfer function or idle function without cooperation with any other components. With the exception of what is more of a theoretical case, in which the first and the second divisions T1 and T2 and the respective speeds of the take-over position 6 and the hand-over position 8 are identical, in these sectors the gripper units F are accelerated or delayed around the transfer axis X by their drive motors M1, M2, namely in adjustment to different working parameters in the take-over situation or in the delivery or hand-over situation, such as to the first and second divisions T1, T2, to the dimension of the fitting A in the circumferential direction, to the speeds of the take-over position 6 and the hand-over position 8 and the like. This is done by the controller CU by means of appropriate programming or a selectable program.

Figure 2:
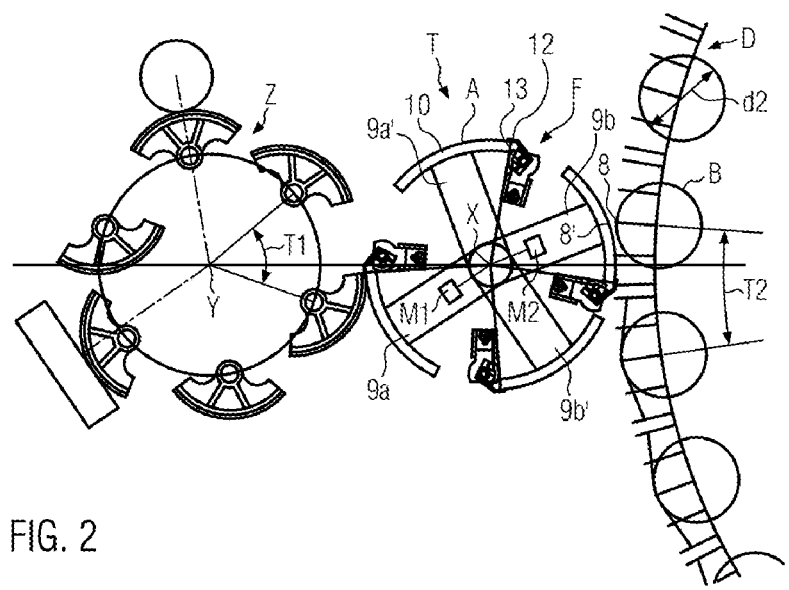

In the embodiment in FIG. 2, the transfer station T has four gripper units F, with two pairs of two each being formed, whereby the two of each pair are permanently coupled to each other and are connected to a shared drive motor M1 or M2. The dimension of the respective fitting A seen in the circumferential direction corresponds, for example, to that of the fittings A of FIG. 1, as does also the first division T1, while the second division T2 in the rotary table D (the containers B could alternatively also be moved linearly past the transfer station T) as well as the diameters d2 of the containers are different than in FIG. 1. These changed working parameters are taken into account individually by each drive motor M1, M2 within the control sectors.

Each of the two gripper units F that share a drive motor M1, M2 is arranged on a bell-crank lever arm with, for example, here, a roughly 90° bend, whereby these gripper units F are positioned and supported in a manner that allows pivoting at different heights in the area of the transfer axis X. Each bell-crank lever arm has a lever arm 9a, 9b and a second lever arm 9a', 9b' on whose outward-facing arm end the pressure pad 10, the anvil strip 13 and the at least one gripper finger 12 are mounted, and each is supported, in a manner that allows pivoting, in the area of its bend, for example, directly or via a console that is not shown, on the transfer axis X and in a drive connection with the drive motor M1, M2.

In the sequence of the method in FIG. 2, the upper gripper unit F of the permanently coupled first pair has already taken over a fitting A. It now exercises a simple transfer function in the clockwise direction while the second gripper unit F of the pair is just on the point of lifting a glued fitting A at the take-over position 6. Of the second pair of permanently coupled gripper units F, the right one in FIG. 2 is just about to apply the fitting A at the hand-over position 8 (the concurrence of the positions 8, 8' is just about to occur), while the lower gripper unit F of this pair is moved "empty" again in the direction of the feeder Z. At the latest, shortly before the reaching of the hand-over position 8, the upper gripper unit F of the first pair in FIG. 2 is accelerated or delayed to the delivery situation in the control sector as preparation, whereby the gripper unit F of this pair that is permanently coupled to it has already taken over a fitting A completely and now has only a transfer function. At roughly this point in time, the right gripper unit in FIG. 2 has completed the delivery, so that the lower gripper unit F in FIG. 2, at the latest upon reaching the take-over position 6 of the gripper finger 12, has been accelerated or delayed such that the pressure pad 10 and the gripper finger 6 are moved synchronously with the speed of the glue pallet.

Figure 3:
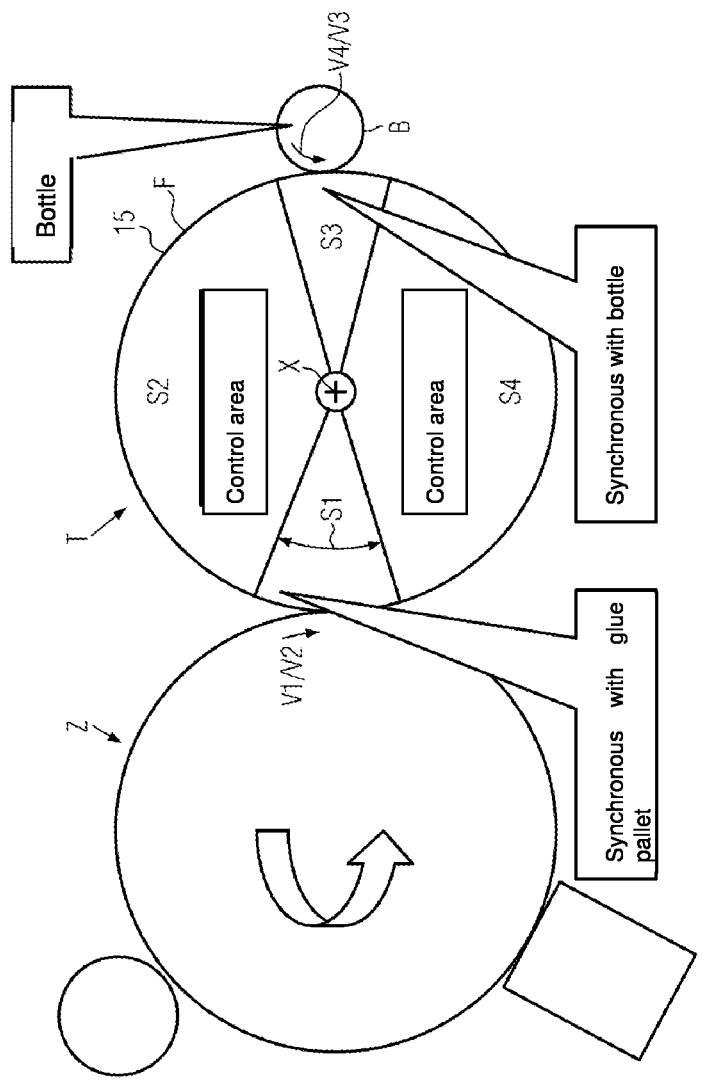

Supplementary to FIGS. 1 and 2, the schematic representation in FIG. 3 shows the division of the rotational path 15 of each gripper unit F into a total of four sectors 51, S2, S3 and S4 during a full rotation. Taking place in sector S1 is a drive of the gripper unit F around the transfer axis X synchronously with the movement speed of the surface of the glue pallet (superimposed speeds V1 and V2). In the sector S2 that follows in the circumferential direction, whereby this sector is a control sector, there takes place a regulation of the movement speed of the gripper unit F, where applicable, for a preparatory adjustment to the speed of the hand-over position resulting from the superimposed speeds V3 and V4, as well as to the fitting dimension and to the second division T2. In sector S3, the gripper unit F moves synchronously with the hand-over position 8 on the container B. In the last sector S4, which is, in turn, a control sector, there is an adjustment to the first division T1 and to the speed of the take-over position 6, i.e., to the take-over situation that is then controlled precisely in sector S1. All together, in the method each gripper unit is consequently periodically driven around the transfer axis X within a full rotation according to an unequal speed profile.

Figure 4:
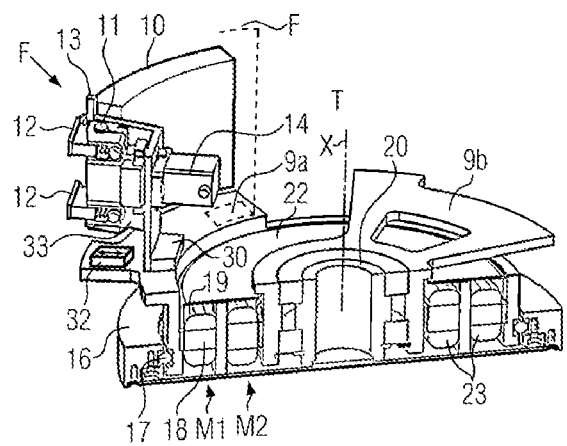

FIG. 4 illustrates an embodiment of the transfer station T, for example, equipped with two gripper units F (similar to FIG. 1). Shown in dashes is, as an option, at least one further gripper unit F', which lies at a higher level than the shown gripper unit F, and which, for example, can be used for simultaneous transfer and application of a further fitting by means of the same drive motor M1, M2. Because, due to the drive motors M1 to M4 in the transfer station T, no drive connection with the feeder Z or the rotary table D is needed, a further transfer station T with the same type of design could be placed alongside for another type of fitting.

In FIG. 4, the two drive motors M1, M2 for the lever arms 9a, 9b are, for example, electric torque motors, which are nested one inside the other in a stationary manner under a covering 22 on a base frame 23 and coaxially to the transfer axis X. The lever arm 9b is, for example, supported on a stationary central, preferably hollow, support pipe 20 in a manner that allows pivoting, while the lever arm 9a is supported via a large-diameter roller bearing 17 in an annular body 16 that is connected to the base frame 23. Each torque motor has a stationary stator, in a ring form and containing a coil 28, while the ring-shaped rotor is either connected to the respective lever arm 9a, 9b or is constituted by this and bears magnets 19 distributed in the circumferential direction. The gripper unit F is mounted on the lever arm 9a with a console 50 in FIG. 4.

The console 50 that bears the gripper unit F can, in a detailed variant (FIG. 4), additionally be adjusted via a, for example, electrical or pneumatic, linear drive 32 in the direction of a double-arrow 33, for example, roughly radially to the transfer axis X, and consequently can provide an additional degree of mobility, e.g., radially and linearly (option). Alternatively, the gripper unit F could also be adjustable around a pivot axis on the lever arm 9a or the console 50, said axis being positioned roughly parallel to the transfer axis X, whereby for this pivoting movement, likewise a drive (not shown) could be arranged, for example on the lever arm 9a or 9b of the console 50. The power supply or the sensor signals of the respective gripper unit F could otherwise be arranged by means of the hollow core area of the transfer axis X by means of cable, for example, as could also that or those of the activation drive 14 of the gripper finger 12.

Because the drive motors M1, M2 (torque motors) are nested one inside the other, a low overall height and compact dimensions are achieved. The lever arms 9a, 9b are equipped and connected in such a manner that they are movable around the transfer axis X relative to each other across specific angular ranges without colliding with each other.

Figure 5:
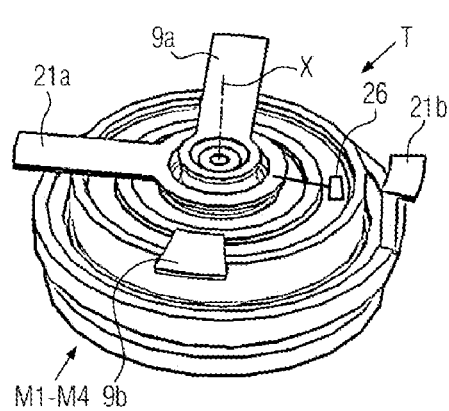
Figure 6:
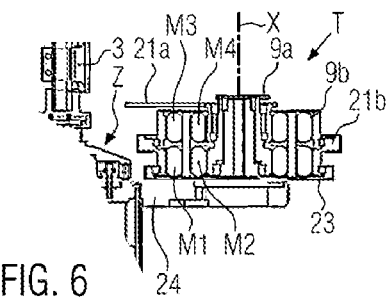
Figure 7:
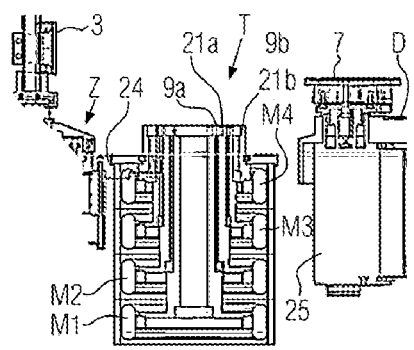

While the embodiment of the transfer station T shown in FIGS. 5, 6 and 7 with four drive motors M1 to M4 contains, like the transfer station T in FIG. 2, four gripper units F, each gripper unit F is arranged on its own lever arm 9a, 9b, 21a, 21b and is coupled to its own drive motor and consequently can be driven around the transfer axis X individually and relative to all other gripper units F. Naturally the transfer station T could also have only three or more than four gripper units F and drive motors.

In FIG. 5, an imbalance compensation mass 26 is provided for the lever arm 21a of a gripper unit F (not shown), the imbalance compensation mass 26 being located opposite with respect to the transfer axis X, in order to guarantee clean, low-vibration, concentric running even at relatively high speed changes or circumferential speeds. Such imbalance compensation masses 26 can be allocated to all provided gripper units F.

FIG. 6 shows, in an axial section of the transfer station T, for example, its allocation to the feeder Z or to its glue pallet 3. The four drive motors M1 to M4 are also coaxial torque motors here, whereby they are nested one inside the other in pairs and stacked one above the other in pairs in order to reduce the overall height and constructed space. The lever arms 9a, 9b, 21a, 21b are, at least in the central area, located at different heights in order to prevent them from colliding with one another. Of the rotary table D, a rotary plate 7 with a servo drive 25 is shown, on which the container that is to be given the fitting A moves past the transfer station T while thereby rotating.

FIG. 7 shows a detailed variant with regard to FIGS. 5 and 6. Four drive motors M1 to M4 (here, torque motors) that are coaxial with the transfer axis X are stacked one above the other. The lever arms 9a, 9b, 21a, 21b, of which each bears at least one gripper unit F (not shown), are connected to nested hollow shafts 30 that are supported on one another in a manner that allows pivoting and on a frame 24 on which the feeder Z can also be mounted.

FIG. 8 shows an embodiment of a transfer station T with four gripper units F on four lever arms 9a, 9b, 21a, 21b, each driven by its own drive motor M1 to M4, in the present case by electric servomotors (servomotors that can be regulated by position and/or torque and/or speed and/or rotational speed), that are mounted on the bottom of the stationary base frame 23, and that cog with drive pinions 28 with different sprockets 27, to each of which one lever arm is allocated. The motion is transmitted from the sprockets 27 via hollow shafts that are nested one in the other and that are supported, one inside the other, in a manner that allows pivoting, to the lever arms 9a, 9b, 21a, 21b, which can be arranged at different heights and which are formed such that they have sufficient movement play in the circumferential direction relative to one another so that they do not collide with one another at individual different drive speeds.

FIG. 9 illustrates another drive concept, again with electric servomotors as drive motors M1 to M4, similar to FIG. 8 (only the drive motors M1 and M3 and one gripper unit F on the lever arm 9a are shown). The drive pinions 28 project over the stationary base frame 23, on the bottom of which the drive motors M1 to M4 are mounted. Furthermore similar to FIG. 4, on the top side of the stationary base frame 23 a stationary plate 16 is supported that also is used for the pivoting support of the lever arms, which are attached to the nested hollow shafts 30, which themselves for example, are supported in a manner that allows pivoting via roller bearing 29 next to one another and on a central support pipe 20 as well as in the plate 16.

The transfer station T (detailed variant), half of which is shown in FIG. 10, corresponds in principle to that shown in FIG. 2, because two gripper units F, one following the other in the circumferential direction, are arranged on each lever arm 9a, 9a' and they are consequently permanently connected and share a common drive motor M1 or M2 (here servomotors). The drive motors M1, M2 are mounted to the bottom of the stationary base frame 23 such that they are offset laterally next to the transfer axis X and, with their drive pinions 28, grip, via teeth 31 into the sprockets of the hollow shafts 30, to which the lever arms 9a, 9a' (also 9b, 9b', as shown in FIG. 2, but not in FIG. 10) are connected and on which the gripper units F are mounted.

The transfer station T shown in FIG. 10 is, as mentioned, equipped with four gripper units F in a plane, whereby pairs of these gripper units F share a common drive motor M1 or M2. It would certainly be possible to accommodate more than four gripper units F in the transfer station T, expediently an even number, whereby pairs of these share a common drive motor and are driven in pairs individually relative to other pairs.

It is furthermore possible to expand or reduce the respective transfer station T modularly without an exchange of the main assemblies, e.g., by adding or removing gripper units and/or drive motors.

Because in the case of the method carried out in the respective transfer station T, each gripper unit F that is just carrying out a take-over or hand-over function is driven individually but synchronously with the feeder Z or with the container B by means of a drive motor contained in the transfer station, and because control sectors S2, S4 of each full rotation of a gripper unit that is just executing only a transfer function or that is empty are used for the individual change of the speed relative to the other gripper units, with one type of the transfer station it is possible to process different dimensions of fittings in the circumferential direction universally, and it is possible to deal with different container diameters and at least rotary table divisions easily, without having to exchange the transfer station or manipulate it manually, for example, by means of only the appropriate programming of the controller CU and regulation of the drive motors M1 to M4. Furthermore, in this design, it is possible to combine the transfer station T modularly with different feeders Z and/or with different rotary tables D or also linear container conveyor devices or their divisions, because the rigid geometry of the gripper units of rotationally driven fitting transfer or gripper cylinders common until now has been eliminated and replaced with a highly flexible, servo-controlled, modularly constructed system of a transfer station T according to the disclosure.

The invention claimed is:

1. Device for the transfer of container fittings, comprising at least two gripper units offset in the circumferential direction around a transfer axis of a transfer station, each gripper unit being able to be activated in a clocked manner, wherein each gripper unit takes over from a feeder, via a movement around the transfer axis generated by an electric servomotor, at least one container fitting individually from a moving take-over position and transfers the container fitting through the transfer station to a moving hand-over position offset in the circumferential direction of the transfer station with respect to the take-over position, the gripper units being arranged such that they can be moved around the transfer axis relative to one another, the transfer station comprising the electric servomotors as drive motors of the gripper units for generating within one full revolution of each gripper unit individually periodically non-uniform movements of the gripper units can be generated in the circumferential direction, wherein each electric servomotor comprises a torque motor with a stationary, coil-containing stator and a ring armature with magnets coupled to, the ring armature being coupled to at least one gripper unit, the electric servomotors being stacked one above the other or nested one inside the other.

2. A device according to claim 1, wherein each full revolution of a gripper unit is divided into a plurality of successive drive motor control areas, comprising a take-over sector that is synchronized with the movement of the feeder take-over position, a subsequent first control sector which is individually coordinated at least to a second division adapted to a division between take-over positions and/or to the dimension of the fittings in the circumferential direction and/or to container dimensions and with individual accelerations or delays, a subsequent delivery sector that is synchronized to a rotational path movement or passing-by movement of the hand-over position, and a concluding second control sector that is individually coordinated to a first division between take-over positions and/or to the dimension of the fitting in the circumferential direction, with individual acceleration or delay of the respective drive movement of at least one gripper unit.

3. The device according to claim 2, wherein the feeder take-over position is situated on a glue pallet.

4. The device according to claim 1, wherein two or more than two gripper units are provided and that a separate drive motor is provided for each gripper unit.

5. The device according to claim 1, wherein more than two gripper units are provided in the transfer station, and that a shared drive motor is provided for each at least two gripper units.

6. The device according to claim 5, wherein the lever arm that connects the two gripper units of the total of more than two gripper units of the transfer station to the respective shared drive motor is formed as a bell-crank lever arm that bears a gripper unit on the two arm ends that point outwards away from the transfer axis and that is supported in a manner that allows pivoting around the transfer axis in the area of the bend and is coupled to the drive motor.

7. The device according to claim 6, wherein the bell-crank lever arm is angled at roughly 90°.

8. The device according to claim 6, wherein for each gripper unit or for two gripper units arranged on a bell-crank lever arm, at least one imbalance compensation mass that lies opposite is provided.

9. The device according to claim 5, wherein the shared drive motor is provided for each at least two, successive in the circumstantial direction, gripper units.

10. The device according to claim 1, wherein each gripper unit is, or two gripper units successive in the circumferential direction are, arranged on a lever arm that bridges a predetermined radial distance to the transfer axis and that is arranged on a shaft that is coaxial with the transfer axis and is supported in a manner that allows pivoting around the transfer axis.

11. The device according to claim 10, wherein the servomotors are arranged such that they are offset laterally to the transfer axis.

12. The device according to claim 11, wherein the servomotors are each connected to the respective lever arm via a toothed gear.

13. The device according to claim 10, wherein the lever arms of the plurality of gripper units are arranged, at least in the interior sub-areas in the direction of the transfer axis, in different planes.

14. The device according to claim 10, wherein the shaft is a hollow shaft.

15. The device according to claim 1, wherein the transfer station is formed such that the transfer station can be modified modularly by adding or removing at least one gripper unit, or by coupling to or separation from the installed drive motor.

16. The device according to claim 15, wherein when adding or removing at least one gripper unit the drive motor therefor is added or removed.

17. The device according to claim 1, wherein each gripper unit that is connected to a drive motor or each gripper unit of a pair that is connected to a shared drive motor is supported in a manner that allows pivoting around the transfer axis.

18. The device according to claim 17, wherein the support allowing pivoting around the transfer access is in a central hollow shaft support area and/or at least in an outer bearing area.

19. The device according to claim 1, wherein the drive motors are connected to an electronic controller that is programmable and/or that holds appropriate programs for the adjustment of the transfer station, without an exchange, to at least different dimensions of fittings in the circumferential direction and/or to first and second divisions and/or to different container diameters.

20. The device according to claim 1, wherein the container fittings comprise labels during the container labeling.

21. The device according to claim 1, wherein the drive motors are stationary.

22. The device according to claim 1, wherein each electric servomotor is integrated into a direct drive of the respective gripper unit or drives at least one gripper unit individually relative to every other one via a gear box.

23. The device according to claim 1, wherein the servomotors, when nested one inside the other, are nested coaxially with the transfer axis.

24. Device for the transfer of container fittings, comprising at least two gripper units offset in the circumferential direction around a transfer axis of a transfer station, each gripper unit being able to be activated in a clocked manner,
wherein each gripper unit takes over from a feeder, via a movement around the transfer axis generated via an electric servomotor, at least one container fitting individually from a moving take-over position and transfers the container fitting through the transfer station to a moving hand-over position offset in the circumferential direction of the transfer station with respect to the take-over position, the gripper units are arranged such that they move around the transfer axis relative to one another and drive motors are provided in the transfer station for the gripper units that can be moved relative to one another, the transfer station comprising the electric servomotors as drive motors of the gripper units for generating within one full revolution of each gripper unit individually periodically non-uniform movements of the gripper units can be generated in the circumferential direction, wherein each gripper unit comprises, as at least one assembly, an anvil strip, at least one pressure pad, and at least one gripper finger at a location along the anvil strip, wherein the gripper finger is movable between a gripping position and a release position relative to the anvil strip when the gripper unit is activated.

25. The device according to claim 24, wherein each gripper unit comprises two or more assemblies for the simultaneous transfer of fittings, the assemblies lying one above the other in the direction of the transfer axis.

26. The device according to claim 24, wherein each gripper unit additionally comprises, for gripper finger activation, an activation drive, an activation magnet or a piezo drive, which is supported directly or indirectly on the lever arm.

27. The device according to claim 26, wherein the activation drive is an electric servomotor.

28. Device according to claim 24, wherein each assembly of the gripper unit on the lever arm has an additional degree of mobility, and the electric servomotor for adjusting the assembly relative to the lever arm in the direction of the additional degree of mobility.

29. The device according to claim 28, wherein the additional degree of mobility is radial and linear to the transfer axis.

30. The device according to claim 28, wherein the drive motor is an electric or pneumatic linear motor.

* * * * *